Dec. 8, 1964  R. S. ZEBARTH ETAL  3,159,870
METHOD OF DEFEATHERING POULTRY
Filed April 1, 1960  2 Sheets-Sheet 1

INVENTORS.
Ralph S. Zebarth
Richard L. Lewis
BY John E. Franta

ATTORNEYS.

INVENTORS.
Ralph S. Zebarth
Richard L. Lewis
John E. Franta
BY
ATTORNEYS.

United States Patent Office 3,159,870
Patented Dec. 8, 1964

3,159,870
METHOD OF DEFEATHERING POULTRY
Ralph S. Zebarth, Kansas City, Richard L. Lewis, Independence, and John E. Franta, Kansas City, Mo., assignors to Gordon Johnson Company, Kansas City, Mo., a corporation of Missouri
Filed Apr. 1, 1960, Ser. No. 19,344
3 Claims. (Cl. 17—45)

This invention relates to poultry processing and more particularly to feather removal, the primary object being to provide a method that is capable of effectively and quickly removing all of the feathers of the bird without skin or meat damage and without need for additional picking in successive machines requiring extended space requirements.

It is the most important object of the present invention to provide a novel defeathering method permitting use of a poultry picker having a multiplicity of reels so arranged that feather-removing action is imparted to substantially the entire bird throughout the time it is advanced through the machine whereby, upon making two passes therethrough, once hanging by its legs and once by its neck, the bird is stripped clean of all feathers without barking or other damage to the carcass.

Still another very important object of the present invention is to provide a method utilizing a poultry picker wherein the cooperative action between the reels is such that the hard to remove feathers, especially the wing feathers, and those disposed between the wings and the body of the bird are plucked therefrom in a snap-action manner because of a cross action wherein the flexible picking fingers tend to move the wings and, therefore, their feathers in opposite directions.

Another important object of the instant invention is to provide a novel method such that the bird moves through a serpentine path of travel with a consequent oscillation and a resultant picking of all of the feathers throughout the length and circumference of the body of the carcass, as well as throughout all appendages including the wings, the necks, the hocks and the legs.

Still another important object of the present invention is to provide a method utilizing a poultry picker having the reels thereof arranged to permit driving at maximum peripheral speeds by virtue of the fact that the reels are disposed in a substantially V-shaped configuration conforming essentially to the shape of the bird advanced through the machine and between the reels.

Figure 1:
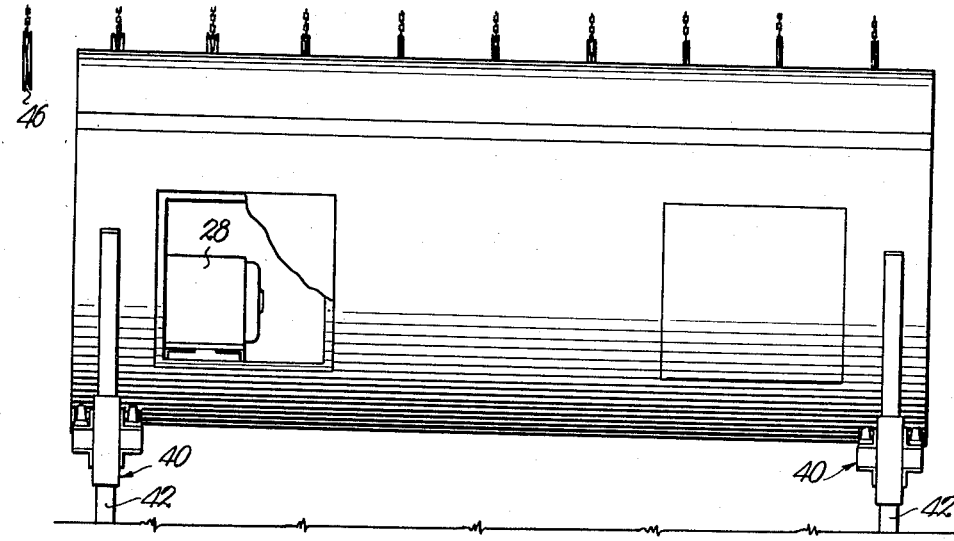
FIGURE 1 is a side elevational view of a multiple reel poultry picker made pursuant to my present invention, parts being broken away for clearness.

A pair of elongated, upper reels 10 and 12 may be substantially identical, and in the same manner, a pair of lower reels 14 and 16 may be of the same nature but differing in some respects as will hereinafter be made clear, from the corresponding reels 10 and 12 respectively. In other words, it is noted that the reel 14 is spaced vertically from the reel 10 therebelow, and that the reel 16 is associated with the reel 12 in the same manner.

Structurally, the elements for supporting the flexible fingers (hereinafter described), are the same in each of the four reels, including a longitudinal shaft 18 made up of a tube 20 having stubs 22 and 24 plugged in the ends thereof and supported by bearings 26. There are advantages in providing a prime mover 28, such as an electric motor, for each reel respectively, and coupled therewith by belts 30 trained over sheaves 32 that are in turn secured to the shafts 18.

Each tube 20 has a plurality of circular discs 34 rigidly secured thereto and extending in horizontally spaced relationship throughout the length of the tube 20.

A plurality of longitudinal bars 36 are rigidly secured to the peripheries of the discs 34, as by welding, and spaced circumferentially and uniformly around the discs 34.

Each bar 36 is provided with a number of equally spaced, polygonal openings 38 throughout its length for receiving the aforementioned picking fingers. The way in which the fingers are retained in the openings 38 may be similar to the construction more fully disclosed in U.S. Letters Patent No. 2,694,829; therefore, the disclosure of such patent is incorporated herein and to which reference may be had for a better understanding of the instant invention.

More specifically, the reels of the instant invention are in many respects similar to those of my U.S. Letters Patent No. 2,859,471, and such patent is likewise incorporated herein by reference for a better understanding of the instant disclosure.

As in said Patent No. 2,859,471, the reels are supported at the ends thereof by extensible framework broadly designated by the numeral 40, whereby the distances between the reels may be adjusted, and such framework 40 is in turn carried by standards 42 for vertical movement, whereby the height of the machine may be varied and the angularity of the normally horizontal shafts 18 may be adjusted. For example, FIG. 1 illustrates a slight incline in the machine, and under certain conditions, such variance from the horizontal may produce beneficial results. It is to be understood that the poultry to be de-feathered is advanced continuously through the machine between the reels by an overhead conveyor wherein each bird 44 is suspended from a shackle 46 carried and advanced by the overhead conveyor, bird 44 being shown in FIG. 3 suspended by its legs.

Figure 2:
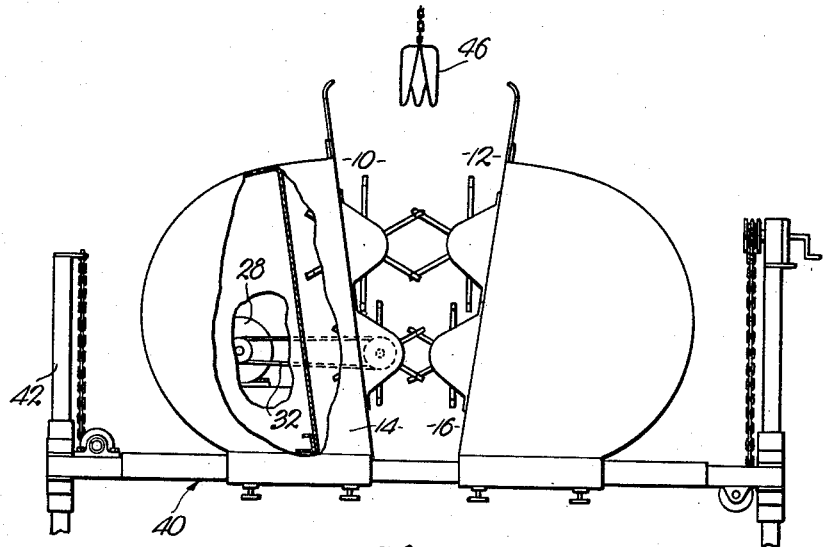
FIG. 2 is an end elevational view thereof, parts being broken away for clearness.

It is important to note in FIGS. 2 and 3 of the drawings that the reels 14 and 16 are not disposed directly below the corresponding reels 10 and 12 respectively, but that their shafts 18 are closer together than are the shafts 18 of the reels 10 and 12. However, the shafts 18 of reels 10 and 12 are equally spaced from a central vertical plane extending longitudinally through the machine, and in the same manner, the distance between such plane and each of the shafts 18 for the reels 14 and 16, is the same.

Such V-shaped arrangement of the four reels is maintained throughout all adjustments, both horizontally and vertically. In other words, when the two reels 12 and 16 are moved horizontally toward and away from the reels 10 and 14, and/or when the reels 10 and 14 are so shifted, the four shafts 18 preferably remain in substantial parallelism. By the same token, such parallelism among the four shafts 18 is not changed when vertical adjustment is made, shifting either or both of the frames 40 with respect to the standards or legs 42.

Figure 3:
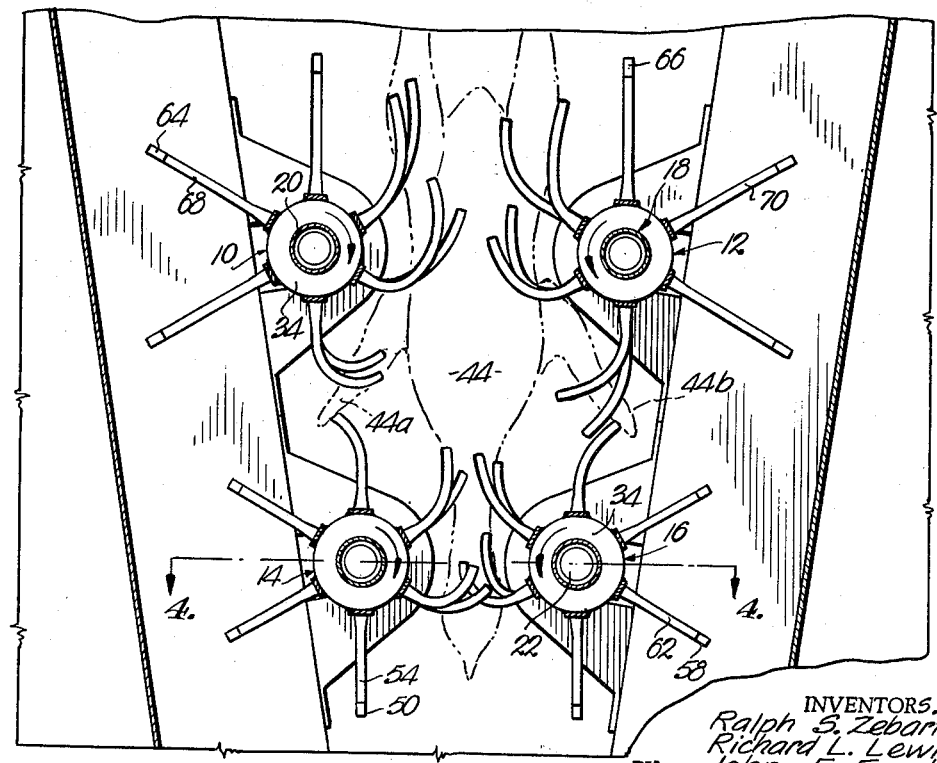
FIG. 3 is an enlarged, fragmentary, vertical, cross-sectional view through the reels of the picker and illustrating the action thereon upon a bird suspended between the reels.

FIG. 3 of the drawings illustrates by arrows also, the directions of rotation of the reels, reels 10 and 14 rotating clockwise, and reels 12 and 16 rotating anti-clockwise. Consequently, reels 10 and 12 rotate oppositely and reel 14 rotates in a direction opposite to the direction of rotation of reel 16. Reels 14 and 16 rotate at the same speeds and in the same manner, the speeds of rotation of the reels 10 and 12 are the same. However, the speeds of the reels 14 and 16 are different from the speeds of the reels 10 and 12 so that the peripheral speeds of all of the reels are the same.

As above indicated, each of the four reels is provided with a multitude of radially extending, elongated, flexible fingers carried by the bars 36 within the openings 38. Such fingers, made from rubber or other flexible material, may be transversely semicircular, and roughened or ribbed along their flat faces in much the same manner as disclosed in my Patent No. 2,859,471 aforementioned. While the diameters and thicknesses of all of the fingers may be the same, they vary in length.

Figure 4:
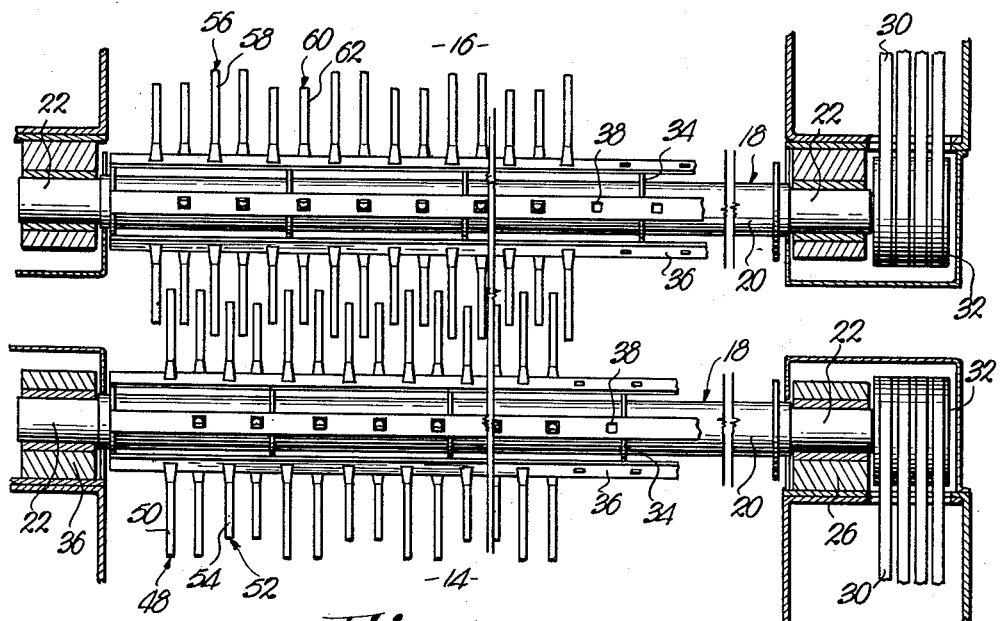
FIG. 4 is a fragmentary, cross-sectional view taken on line 4—4 of FIG. 3.

In FIG. 4 of the drawings, showing reels 14 and 16, reel 14 is shown provided with a number of circular rows 48 of relatively long fingers 50, and a number of circular rows 52 of shorter fingers 54.

Referring to FIG. 3, it is seen that there are six fingers 50 in each of the rows 48 and a like number of fingers 54 is provided in each row 52. FIG. 4 illustrates also the way in which the fingers of each bar 36 are offset relative to the fingers of each bar 36 next adjacent thereto. Considering but one of the bars 36, the long fingers 50 alternate with the short fingers 54 in the longitudinal row of fingers along the bar 36.

Reel 16 is made in the same manner, presenting a plurality of circular rows 56 of relatively long fingers 58 and a plurality of rows 60 of shorter fingers 62. Fingers 58 are equal in length to the fingers 50, and the fingers 54 and 62 are identical in length.

By virtue of such construction, it is seen in FIG. 4 that each short finger 62 overlaps a corresponding long finger 50 closely adjacent thereto. By the same token, and alternately, each short finger 54 overlaps and is proximal to a corresponding long finger 58.

The form of the reels 10 and 12 is the same as illustrated in FIG. 4 with respect to reels 14 and 16, the relatively long fingers of the reels 10 and 12 being designated by the numerals 64 and 66 respectively, and the shorter fingers of the reels 10 and 12 being designated by the numerals 68 and 70 respectively. However, the fingers 64 and 66, which are of the same length, are longer than the fingers 50 and 58. And, the identical fingers 68 and 70 are longer than the fingers 54 and 62. In fact, in the construction chosen for illustration, the fingers 68 and 70 are slightly longer than the fingers 50 and 58.

It is to be pointed out however, that the extent of overlapping of the fingers of the reels 10 and 12 is the same as in reels 14 and 16, notwithstanding the fact that there are four different lengths in the fingers 54-62, 50-58, 68-70, and 64-66 because of the fact that the reels 10 and 12 are farther apart than the reels 14 and 16 with a spacing chosen to effect such identity of overlapping. By the same token, the spacing between reels 10 and 14 and the spacing between the reels 12 and 16 is such as to provide the same extent of overlapping of the fingers top to bottom.

In other words, the relationship of the fingers of the upper reels to the fingers of the lower reels is the same as depicted in FIG. 4 of the drawings. The short fingers 70 of reel 12 overlap closely the longer fingers 58 of the reel 16, and the short fingers 62 of the reel 16 overlap and are closely arranged with respect to corresponding long fingers 66 in the reel 12. This same relationship between the long fingers and the short fingers is provided for between the reels 10 and 14.

From the foregoing, it can be appreciated that the novel method of the instant invention contemplates a slapping action imparted to the body of the bird 44 by the flexible fingers of the upper reels 10 and 12, and a similar but separate slapping action, imparted to appendages of such body, as for example, the neck of the bird 44 through the action of the fingers of the lower reels 14 and 16.

These two actions are carried out without interruption throughout the time the bird 44 is advanced through the machine between the two sets of reels. The overhead conveyor from which the birds 44 are suspended by the shackles 46, holds the birds against descent as all of the fingers tend to impart a downwardly and inwardly slapping force upon the bodies and the necks of the birds.

It is to be noted that the action of the reels 10 and 12 upon the body of bird 44, is opposite and that opposed forces are similarly imparted upon the neck of bird 44 by the fingers of the lower reels 14 and 16. Conversely, when the bird 44 is suspended from shackle 46 by its neck in a successive machine of identical nature, the fingers of the upper reels 10 and 12 act upon the bird's body to remove feathers not pulled therefrom in the first pass through the first machine. At the same time, the lower fingers act upon the legs and the hocks to remove feathers therefrom in the same manner as FIG. 3 of the drawing illustrates the feather removing of the lower reels on the bird's neck.

An important step in the method has to do with the way in which the feathers are removed from the wings of the birds 44 simultaneously with the actions just above described, but through different and separate forces applied thereto. Since the reels 10 and 14 rotate in the same direction, their fingers travel opopsitely at points of crossing and, as a consequence, the fingers 64 and 68 of the reel 10, acting downwardly and outwardly on wing 44a, tend to pull or deflect the wing 44a, as well as its feathers, in an outwardly and downwardly direction. On the other hand, the fingers 50 and 54 of the reel 14 tend to deflect the wing 44a and its feathers, upwardly and inwardly. These opposite slapping and pulling forces on the feathers of the wing 44a, pluck the fingers in a snap-action manner more effectively than methods heretofore employed. The cross-action effect upon the feathers of the wing 44a is such as to deflect the feathers in a direction opposite to the normal lay thereof. In other words, for the most part, the wing feathers all tend to grow or lie outwardly and, therefore, as the fingers of the reel 10 tend to pull the feathers in a direction coincident with the direction in which the wing feathers are normally disposed, the fingers in the reel 14, snap the wing feathers inwardly and upwardly in a direction opposite to the normal disposition of the wing feathers. Manifestly, the same forces are applied to the wing 44b by the fingers of the reels 12 and 16 respectively.

Hence, when the bird 44 is reversed and caused to pass through the machine illustrated in the drawings, or through another identical machine hanging from its neck, the wings 44a and 44b hang toward the legs and hocks and are pulled outwardly and downwardly by the action of the four reels in the same manner as illustrated in FIG. 3. As a result of the cross-action, all of the hard to remove wing feathers, as well as the still more difficult to remove feathers at the junctions between the wings and the body, are effectively and completely removed.

In the method further, there are movements on the part of the birds 44 which add materially to the effective defeathering operation. They include a serpentine path of travel of the birds 44 while suspended, resulting also in continuous oscillation about a vertical axis through the bird. Viewing FIG. 4, attention is called to the fact that the suspended bird 44, which is free to swing in all directions, tends to follow a path of least resistance between the fingers of reels 14 and 16, and of course, between the fingers of reels 10 and 12. The least resistance to forward advancement is adjacent the terminal ends of the fingers rather than their base ends adjacent the bars 36. Consequently, the bird 44 shifts laterally because of the short and long fingers, moving first toward the reels 10 and 14 and then toward the reels 12 and 16. In fact, the appendages, i.e., the neck, or the legs and hocks as the cause may be, may at times, move laterally in a direction opposite to the lateral movement of the body. In any event, such lateral movement automatically causes the entire bird to oscillate, first in one direction and then in the opposite direction about its vertical axis throughout the time it travels from one end of the machine to the opposite end thereof. Such constant zigzag advancement, accompanied by a continual twisting, turning and lateral deflection, appreciably augments the defeathering results accomplished by the method of this invention.

Again, the use of long and short fingers in each of the four reels, contributes to good feather removal when it is understood that in each bird, there are differing types of feathers to be removed. The relatively long, more flexible fingers operate best in the removal of the easier to remove covering feathers and many of the protective feathers of the bird. On the other hand, the shorter, less flexible fingers of the reels, operate to pick the pin feathers and other hard to remove feathers, all without damage to the tender epidermal skin. The action, by virtue especially of the use of ribbed or roughened surfaces on the fingers as aforementioned, is, in addition to a slapping force, a frictional rubbing of the fingers against the feathers to thereby pull the feathers from the bird in a gentle, yet aggressive manner. Each reel therefore, imparts a large number of relatively long wiping actions on the feathers with an equal number of alternate short rubbing actions on the feathers.

Keeping in mind the weight or mass acting upon the bird and, therefore, the heaviness of the blow, the peripheral speeds of the reels should be as fast as possible, up to a point of avoiding damage. Insetting of the lower reels 14 and 16 with respect to the upper reels 10 and 12, permits the same peripheral speed in all four reels, notwithstanding the difference in the lengths of the fingers as above described, and of course, the V-shaped arrangement more nearly conforms to the general shape of the bird itself.

Having thus described the invention what is claimed as new and desired to be secured by Letters Patent is:

1. The method of removing feathers from poultry which comprises the steps of continuously advancing a bird to be defeathered along a predetermined path and at a preselected speed of travel while holding the bird suspended and against descent and, while held and advanced, slapping the body of the bird without interruption with opposed, downwardly and inwardly directed, frictional rubbing forces to pull the feathers from said body while simultaneously and uninterruptedly slapping each wing of the bird with outwardly and downwardly, and opposed, inwardly and upwardly directed, frictional rubbing forces separate from the forces applied to the body for pulling the feathers from the wings of the bird and, at the same time, uninterruptedly slapping other appendages of said body with opposed, downwardly and inwardly directed, frictional rubbing forces separate from the forces applied to the body and separate from the forces applied to the wings to pull the feathers from said other appendages.

2. The method of removing feathers from poultry which comprises the steps of continuously advancing a bird to be defeathered along a serpentine path and at a preselected speed of travel while holding the bird suspended and against descent, oscillating the bird while held and advanced, and, while held, advanced and oscillated, slapping the body of the bird without interruption with opposed, downwardly and inwardly directed, frictional rubbing forces to pull the feathers from said body while simultaneously and uninterruptedly slapping each wing of the bird with outwardly and downwardly, and opposed, inwardly and upwardly directed, frictional rubbing forces separate from the forces applied to the body for pulling the feathers from the wings of the bird and, at the same time, uninterruptedly slapping the neck of said bird with opposed, downwardly and inwardly directed, frictional rubbing forces separate from the forces applied to the body and separate from the forces applied to the wings to pull the feathers from said neck.

3. The method of removing feathers from poultry which comprises the steps of continuously advancing a bird to be defeathered along a serpentine path and at a preselected speed of travel while holding the bird suspended and against descent, oscillating the bird while held and advanced, and, while held, advanced and oscillated, slapping the body of the bird without interruption with opposed, downwardly and inwardly directed, frictional rubbing forces to pull the feathers from said body while simultaneously and uninterruptedly slapping each wing of the bird with outwardly and downwardly, and opposed, inwardly and upwardly directed, frictional rubbing forces separate from the forces applied to the body for pulling the feathers from the wings of the bird and, at the same time, uninterruptedly slapping the legs and hocks of said bird with opposed, downwardly and inwardly directed, frictional rubbing forces separate from the forces applied to the body and separate from the forces applied to the wings to pull the feathers from said legs and hocks.

References Cited in the file of this patent

UNITED STATES PATENTS

| | | |
|---|---|---|
| 2,596,443 | Sharp | May 13, 1952 |
| 2,603,831 | Sharp | July 22, 1952 |
| 2,859,471 | Zebarth | Nov. 11, 1958 |
| 2,908,033 | Zebarth | Oct. 13, 1959 |
| 2,945,257 | Corey et al. | July 19, 1960 |